(12) United States Patent
Lattes et al.

(10) Patent No.: US 11,086,186 B2
(45) Date of Patent: Aug. 10, 2021

(54) WOVEN ELECTROPHORETIC MATERIAL

(71) Applicant: E INK CORPORATION, Billerica, MA (US)

(72) Inventors: Ana L. Lattes, Newton, MA (US); Stephen J. Telfer, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 16/404,948

(22) Filed: May 7, 2019

(65) Prior Publication Data

US 2019/0258132 A1 Aug. 22, 2019

Related U.S. Application Data

(63) Continuation of application No. 15/281,301, filed on Sep. 30, 2016, now abandoned.

(60) Provisional application No. 62/235,772, filed on Oct. 1, 2015.

(51) Int. Cl.
| | | |
|---|---|---|
| *G02F 1/1685* | (2019.01) | |
| *E06B 9/24* | (2006.01) | |
| *G02F 1/133* | (2006.01) | |
| *G02F 1/167* | (2019.01) | |
| *G02F 1/1681* | (2019.01) | |

(52) U.S. Cl.
CPC ............. *G02F 1/1685* (2019.01); *E06B 9/24* (2013.01); *G02F 1/13318* (2013.01); *G02F 1/167* (2013.01); *E06B 2009/2411* (2013.01); *E06B 2009/2476* (2013.01); *G02F 1/13324* (2021.01); *G02F 1/1681* (2019.01)

(58) Field of Classification Search
None
See application file for complete search history.

(56) References Cited

U.S. PATENT DOCUMENTS

| | | | |
|---|---|---|---|
| 4,418,346 | A | 11/1983 | Batchelder |
| 5,872,552 | A | 2/1999 | Gordon, II et al. |
| 5,961,804 | A | 10/1999 | Jacobson et al. |
| 6,017,584 | A | 1/2000 | Albert et al. |
| 6,067,185 | A | 5/2000 | Albert et al. |
| 6,120,588 | A | 9/2000 | Jacobson |

(Continued)

FOREIGN PATENT DOCUMENTS

| | | |
|---|---|---|
| JP | S5955986 A | 3/1984 |
| JP | 2007108491 A | 4/2007 |

(Continued)

OTHER PUBLICATIONS

Fernando Rodriguez-Mas et. al. "Expanded Electroluminescence in High Load CdS Nanocrystals PVK-Based LEDs", nanomaterials 2019,9,1212 (Year: 2019).*

(Continued)

*Primary Examiner* — Robert E. Tallman
(74) *Attorney, Agent, or Firm* — Brian D. Bean

(57) ABSTRACT

Variable transmission covering systems that can be used, for example, to control the amount of light passing through a window in a building. Using transmissive electrophoretic media that can switch between a first and second optical state, the invention can be used to change the color and/or transmissivity of a structure (or structures) that is placed in front of an object. In some embodiments, the variable transmission system can change transmission and color on command.

8 Claims, 10 Drawing Sheets

Maximum transmission

Maximum blocking (room darkening)

Intermediate transmission (energy efficiency)

Minimal transmission (privacy)

(56) References Cited

U.S. PATENT DOCUMENTS

| | | |
|---|---|---|
| 6,120,839 A | 9/2000 | Comiskey et al. |
| 6,130,774 A | 10/2000 | Albert et al. |
| 6,144,361 A | 11/2000 | Gordon, II et al. |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,323,989 B1 | 11/2001 | Jacobson et al. |
| 6,377,387 B1 | 4/2002 | Duthaler et al. |
| 6,392,785 B1 | 5/2002 | Albert et al. |
| 6,490,402 B1 | 12/2002 | Ota |
| 6,515,649 B1 | 2/2003 | Albert et al. |
| 6,538,801 B2 | 3/2003 | Jacobson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,672,921 B1 | 1/2004 | Liang et al. |
| 6,693,620 B1 | 2/2004 | Herb et al. |
| 6,721,083 B2 | 4/2004 | Jacobson et al. |
| 6,727,881 B1 | 4/2004 | Albert et al. |
| 6,788,449 B2 | 9/2004 | Liang et al. |
| 6,822,782 B2 | 11/2004 | Honeyman et al. |
| 6,866,760 B2 | 3/2005 | Paolini Jr. et al. |
| 6,870,661 B2 | 3/2005 | Pullen et al. |
| 6,882,355 B2 | 4/2005 | Kobayashi |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,038,655 B2 | 5/2006 | Herb et al. |
| 7,075,502 B1 | 7/2006 | Drzaic et al. |
| 7,109,968 B2 | 9/2006 | Albert et al. |
| 7,116,318 B2 | 10/2006 | Amundson et al. |
| 7,116,466 B2 | 10/2006 | Whitesides et al. |
| 7,170,670 B2 | 1/2007 | Webber |
| 7,180,649 B2 | 2/2007 | Morrison et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,247,379 B2 | 7/2007 | Pullen et al. |
| 7,304,787 B2 | 12/2007 | Whitesides et al. |
| 7,312,784 B2 | 12/2007 | Baucom et al. |
| 7,312,916 B2 | 12/2007 | Pullen et al. |
| 7,327,511 B2 | 2/2008 | Whitesides et al. |
| 7,339,715 B2 | 3/2008 | Webber et al. |
| 7,375,875 B2 | 5/2008 | Whitesides et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,453,445 B2 | 11/2008 | Amundson |
| 7,492,497 B2 | 2/2009 | Paolini, Jr. et al. |
| 7,532,388 B2 | 5/2009 | Whitesides et al. |
| 7,535,624 B2 | 5/2009 | Amundson et al. |
| 7,679,814 B2 | 3/2010 | Paolini, Jr. et al. |
| 7,746,544 B2 | 6/2010 | Comiskey et al. |
| 7,839,564 B2 | 11/2010 | Whitesides et al. |
| 7,848,006 B2 | 12/2010 | Wilcox et al. |
| 7,903,319 B2 | 3/2011 | Honeyman et al. |
| 7,999,787 B2 | 8/2011 | Amundson et al. |
| 8,009,348 B2 | 8/2011 | Zehner et al. |
| 8,018,640 B2 | 9/2011 | Whitesides et al. |
| 8,115,729 B2 | 2/2012 | Danner et al. |
| 8,199,395 B2 | 6/2012 | Whitesides et al. |
| 8,270,064 B2 | 9/2012 | Feick et al. |
| 8,305,341 B2 | 11/2012 | Arango et al. |
| 8,319,759 B2 | 11/2012 | Jacobson et al. |
| 8,390,918 B2 | 3/2013 | Wilcox et al. |
| 8,446,664 B2 | 5/2013 | Chen et al. |
| 8,477,081 B2 | 7/2013 | Daniel |
| 8,576,476 B2 | 11/2013 | Telfer et al. |
| 8,582,196 B2 | 11/2013 | Walls et al. |
| 8,593,718 B2 | 11/2013 | Comiskey et al. |
| 2005/0012980 A1 | 1/2005 | Wilcox et al. |
| 2006/0132427 A1* | 6/2006 | Weisberg ............... G02F 1/167 345/107 |
| 2007/0047065 A1* | 3/2007 | Toyoda ................. G02F 1/167 359/296 |
| 2007/0197115 A1 | 8/2007 | Eves et al. |
| 2007/0268557 A1* | 11/2007 | Chopra ................. G02F 1/167 359/296 |
| 2008/0136774 A1 | 6/2008 | Harris et al. |
| 2008/0316580 A1* | 12/2008 | Gillies .................. G02F 1/167 359/296 |
| 2009/0009852 A1 | 1/2009 | Honeyman et al. |
| 2009/0206499 A1 | 8/2009 | Whitesides |
| 2009/0225398 A1 | 9/2009 | Duthaler et al. |
| 2010/0148385 A1 | 6/2010 | Balko et al. |
| 2011/0193840 A1 | 8/2011 | Amundson et al. |
| 2012/0182308 A1 | 7/2012 | Chang |
| 2012/0293858 A1 | 11/2012 | Telfer, Jr. et al. |
| 2016/0161820 A1 | 6/2016 | Amesz |
| 2018/0364518 A1* | 12/2018 | Paolini, Jr. ............... D01F 6/64 |

FOREIGN PATENT DOCUMENTS

| | | |
|---|---|---|
| JP | 2014105494 A | 6/2014 |
| KR | 20100042565 A | 4/2010 |
| KR | 101401117 B1 | 5/2014 |

OTHER PUBLICATIONS

Korean Intellectual Property Office; PCT/US2016/054620; International Search Report and Written Opinion; dated Jan. 6, 2017.

European Patent Office, EP Appl. No. 16852665.5, Extended European Search Report, dated Jul. 5, 2018.

* cited by examiner

Maximum transmission (FIG. 9A)

Minimum transmission (FIG. 9B)

WOVEN ELECTROPHORETIC MATERIAL

RELATED APPLICATIONS

This application is a continuation of U.S. patent application Ser. No. 15/281,301, filed Sep. 30, 2016, which claims priority to U.S. Provisional Application No. 62/235,772, filed Oct. 1, 2015. All patents, patent applications, and publications cited herein are incorporated by reference in their entireties.

BACKGROUND OF INVENTION

Figure 1:
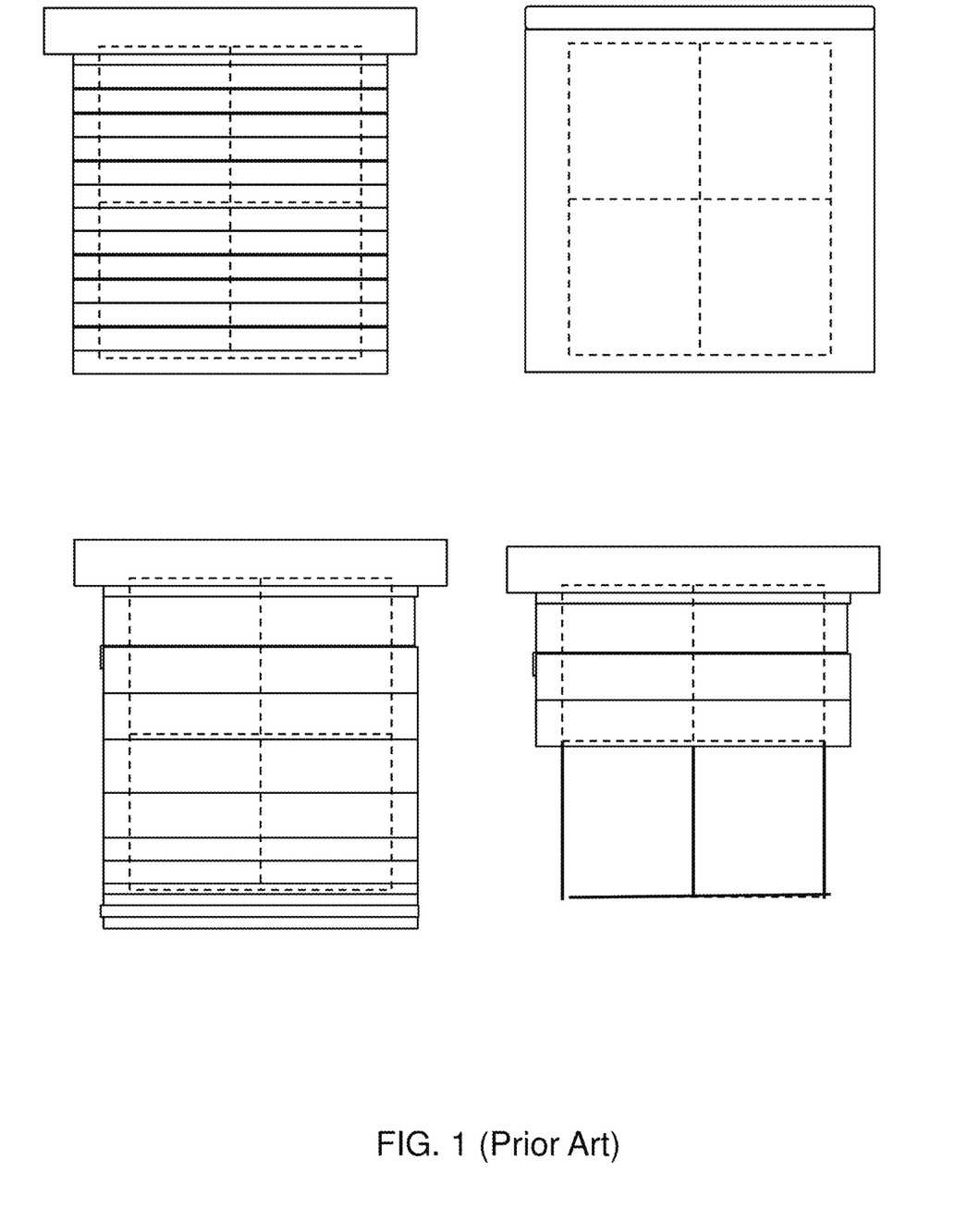
FIG. 1 shows exemplary prior art window coverings. The invention can be incorporated into these coverings in addition to others.

This invention relates to variable transmission coverings and variable color coverings that are configured for use in covering architectural structures, such as windows and walls. The invention can be used to achieve energy savings without having to replace existing structures, e.g., windows, while also providing lasting interior design options. The invention can take the form of any architectural covering, for example horizontal or vertical blinds, accordion blinds, roman shades, or roller shades and screens, e.g., as shown in FIG. 1.

One type of electro-optic display, which has been the subject of intense research and development for a number of years, is the particle-based electrophoretic display, in which a plurality of charged particles moves through a fluid under the influence of an electric field. Electrophoretic displays can have attributes of good brightness and contrast, wide viewing angles, state bistability, and low power consumption when compared with liquid crystal displays.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,870,661; 7,002,728; 7,038,655; 7,170,670; 7,180,649; 7,230,750; 7,230,751; 7,236,290; 7,247,379; 7,312,916; 7,375,875; 7,411,720; 7,532,388; 7,679,814; 7,746,544; 7,848,006; 7,903,319; 8,018,640; 8,115,729; 8,199,395; 8,270,064; and 8,305,341; and U.S. Patent Applications Publication Nos. 2005/0012980; 2008/0266245; 2009/0009852; 2009/0206499; 2009/0225398; 2010/0148385; 2010/0207073; and 2011/0012825;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 7,075,502 and 7,839,564;

(f) Methods for driving displays; see for example U.S. Pat. Nos. 7,012,600 and 7,453,445;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

One potentially important application of shutter mode displays is as light modulators, that is to say to variable transmission windows, mirrors and similar devices designed to modulate the amount of light or other electromagnetic radiation passing through. For example, variable transmission films may be applied to windows to modulate infra-red radiation for controlling the temperatures within a building. Such electronic control can supersede "mechanical" control of incident radiation by, for example, the use of window blinds. Effective implementation of such electronic "variable-transmissivity" ("variable transmission," "VT") technology in buildings is expected to provide (1) reduction of unwanted heating effects during hot weather, thus reducing the amount of energy needed for cooling; (2) increased use of natural daylight, thus reducing energy used for lighting; and (3) increased occupant comfort by increasing both thermal and visual comfort. Other potential applications include of VT technology include privacy glass and glare guards in electronic devices.

Consumers desire variable transmission windows with the broadest possible optical transmission range because this gives the consumer maximum freedom to vary the light level, or conversely the degree of privacy provided by such windows. Because there is usually little difficulty in providing a sufficiently non-transmissive "closed" state of the window (electrophoretic media can readily be formulated to be essentially opaque in this closed state), maximizing the optical transmission range usually amounts to maximizing "open" state. Factors influencing open state transmission include the materials, display construction and production processes used for form the windows, and the methods used to drive the windows to their open and closed states. Nonetheless, many variable transmission systems have difficulty achieving a true "clear" state because of imperfections in the VT films or breakdown of the various polymeric layers with time, e.g., due to UV exposure.

In addition to improved films for variable transmission windows, consumers desire variable transmission materials that can be installed post-construction. Such devices would provide the benefits of variable transmission without the need to replace the relevant architectural element, e.g., windows, door, etc. Consumers additionally desire coverings, such as window coverings, with more flexibility in color and pattern. Such coverings would provide increased flexibility in interior decorating.

SUMMARY OF INVENTION

The invention provides covering systems that can be used to modulate the amount and color of transmitted and/or reflected light. The covering systems can be used for interior design, privacy, decoration, and energy efficiency. The covering systems are separate from the structural elements in a house, building, etc., thereby allowing the devices to be added as desired and removed as needed. In general, a system for modulating light transmission will include one or more variable transmission structures and a controller that sends a signal to the variable transmission structure(s) with instructions to change from a first optical state to a second optical state. The optical states may be, e.g., clear, opaque, partially transmissive, or a specific color. The covering system may also include sensors, such as light sensors, to coordinate optical states. The covering system may include motors to physically move the variable transmission structure(s) between an open and closed state. The covering systems may receive their energy from line voltage, batteries, or solar cells. In some embodiments, the variable transmission structures can be used as window coverings. In some embodiments, the variable transmission structures are flexible, e.g., a roller screen.

While the invention is described predominately as configured to provide variable transmission, e.g., for windows, it is understood that the described structures can also be used to vary the color of the coverings in addition to the transmissivity. A variety of colors are available. In some embodiments, the transmissivity will not vary, and only the color will vary. In general, the color of the variable transmission structures is only limited by the availability of a stable pigment of the color. For example, a consumer may desire a "simple" embodiment that merely transitions from a selected opaque color, e.g., beige, to transparent. In other embodiments, multi-color variable transmission structures may be used that provide a gamut of colors for the invention. Such devices may be constructed with a set of addressable primary colors, such as red, green, blue or cyan, magenta, and yellow.

As described in more detail below, the variable transmission structures of the invention typically comprise an electro-optic medium sandwiched between two transparent (or translucent) electrodes, wherein the electrodes are configured to deliver electric fields sufficient to cause a change in optical state of the variable transmission structures. In preferred embodiments, the electro-optic medium will comprise an electrophoretic material including a plurality of electrically charged particles disposed in a fluid and capable of moving through the fluid under the influence of an electric field. The electrophoretic material may be encapsulated in capsules, e.g., gelatinous capsules, or the electrophoretic material can be segregated in pre-formed microcells. Because variable transmission structures using electrophoretic media are lightweight and use little energy, they are well suited for general use for architectural coverings.

In another aspect the invention includes window covering systems including a plurality of variable color structures, or variable transmission structures, or variable color and transmission structures that do not contact the window. The variable structures comprise electro-optic media, such as electrophoretic media, and are configured to transition between a first color state and a second color state upon receipt of a signal, or between a first and second transmission state upon receipt of a signal, or some combination thereof. The system also includes a controller configured to send the signal(s) to the plurality of variable color/transmission structures, thereby causing the plurality of variable transmission structures to transition between the first color state and the second color state, or the first and second transmission states, or some combination thereof.

DETAILED DESCRIPTION

Figure 2:
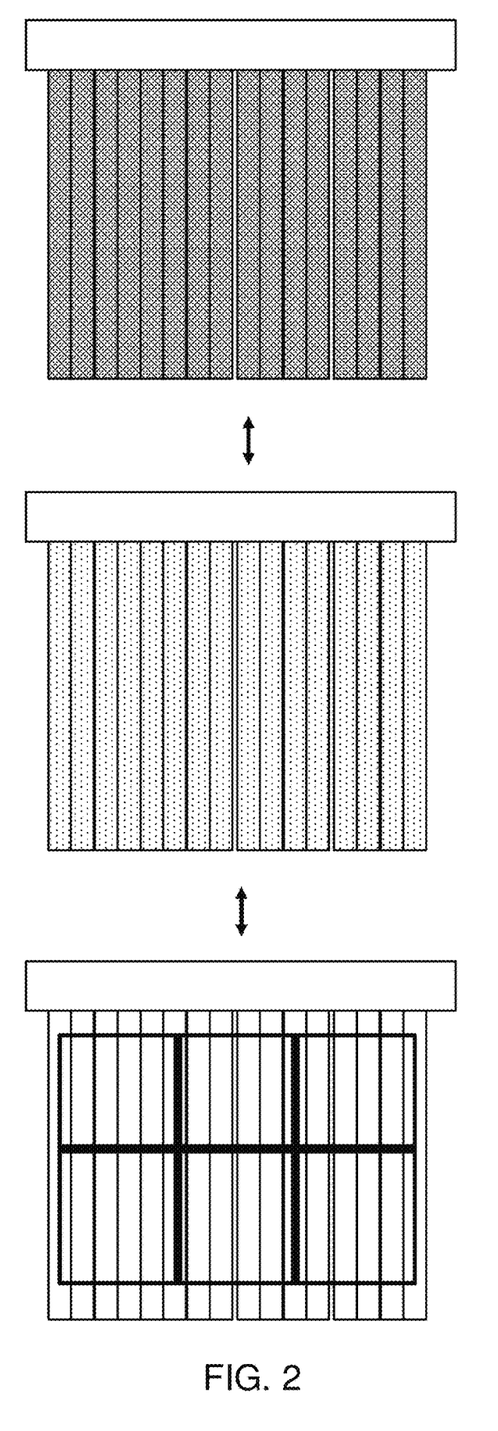
FIG. 2 depicts a vertical blind of the invention configured to change color and transmissivity.

As indicated above, the present invention provides covering systems that can be used, for example, to control the amount of light passing through a window. As shown in FIG. 2, such a covering system of the invention can be used to change the color and the transmissivity of a variable transmission structure (or structures) that is placed in front of an object. Thus, the invention allows a user to modify the look of a design element, e.g., vertical blinds as shown in FIG. 2, while also regulating the amount of light that passes through a window.

Figure 3:
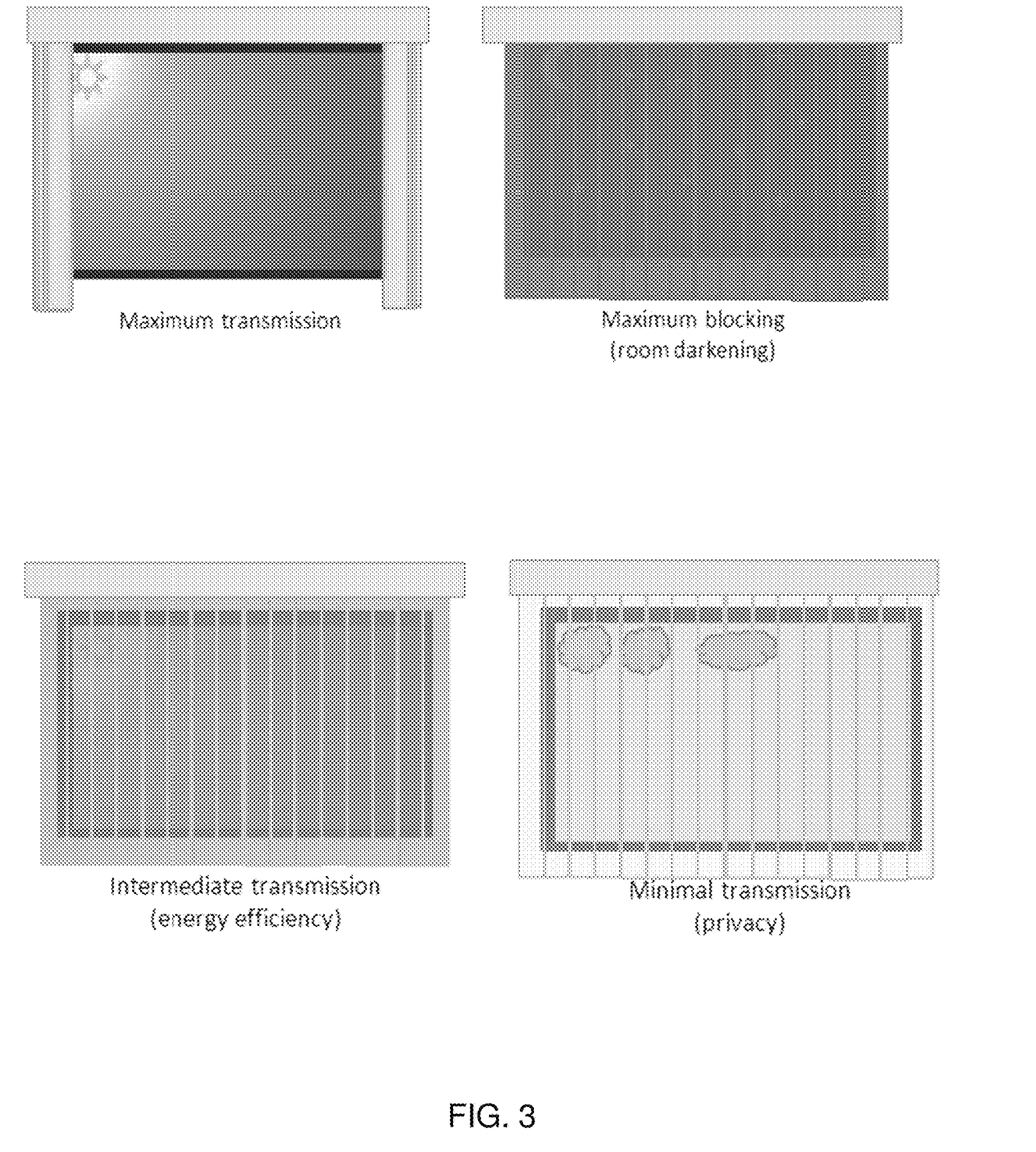
FIG. 3 depicts various transmission states of a vertical blind of the invention. Because the blind can be opened, like a conventional vertical blind, a user can enjoy a completely unobstructed view through the window without haze.

As discussed previously, control systems of the invention include one or more variable transmission structures and a controller to control the state of the variable transmission structure(s). The variable transmission structures, in turn, include two or more transparent electrodes and an electro-optic medium that can be switched between optical states. As shown in FIG. 3, the variable transmission structures can be used to regulate an amount of light that enters a room via a window. For example, the structure may include a motor that physically moves the individual variable transmission structures between an open state (FIG. 3—Maximum transmission) and a closed state. The optical state of the variable transmission structures can also be modified from, e.g., an opaque state (FIG. 3—Maximum blocking) to an intermediate states of transmission that will allow less light to enter via a window, and/or provide privacy to the user.

Figure 4:
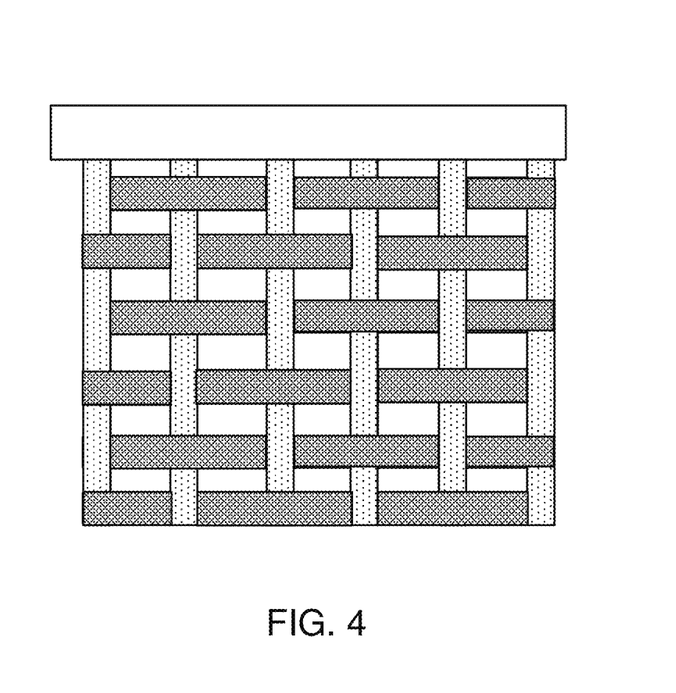
FIG. 4 depicts an embodiment of the invention that incorporates both traditional and electro-optic materials to create a variable transmission window covering.

A variable transmission structure of the invention may include both electro-optic and traditional (e.g., fabric, polymer) materials. For example, as shown in FIG. 4, electro-optic variable transmission structures (horizontal) may be interwoven with fabric sections (vertical) to produce a variable transmission structure that is not completely transparent, but can be altered on demand to increase or decrease the amount of light that is transmitted through the structure. The mixture of electro-optic and traditional materials need not be in a 1:1 ratio, as shown in FIG. 4. For example, a variable transmission structure may include 10 times more surface area of electro-optic material than traditional material. Alternatively, a variable transmission structure may include 10 times more surface area of traditional material than electro-optic material. Of course, intermediate ratios are also possible, such as 5:1, 3:1, 2:1, 1:1, 1:2, 1:3, 1:5, etc. In other embodiments, the variable transmission structure may include two different types of electro-optic material that are interwoven, similar to FIG. 4.

Figure 5:
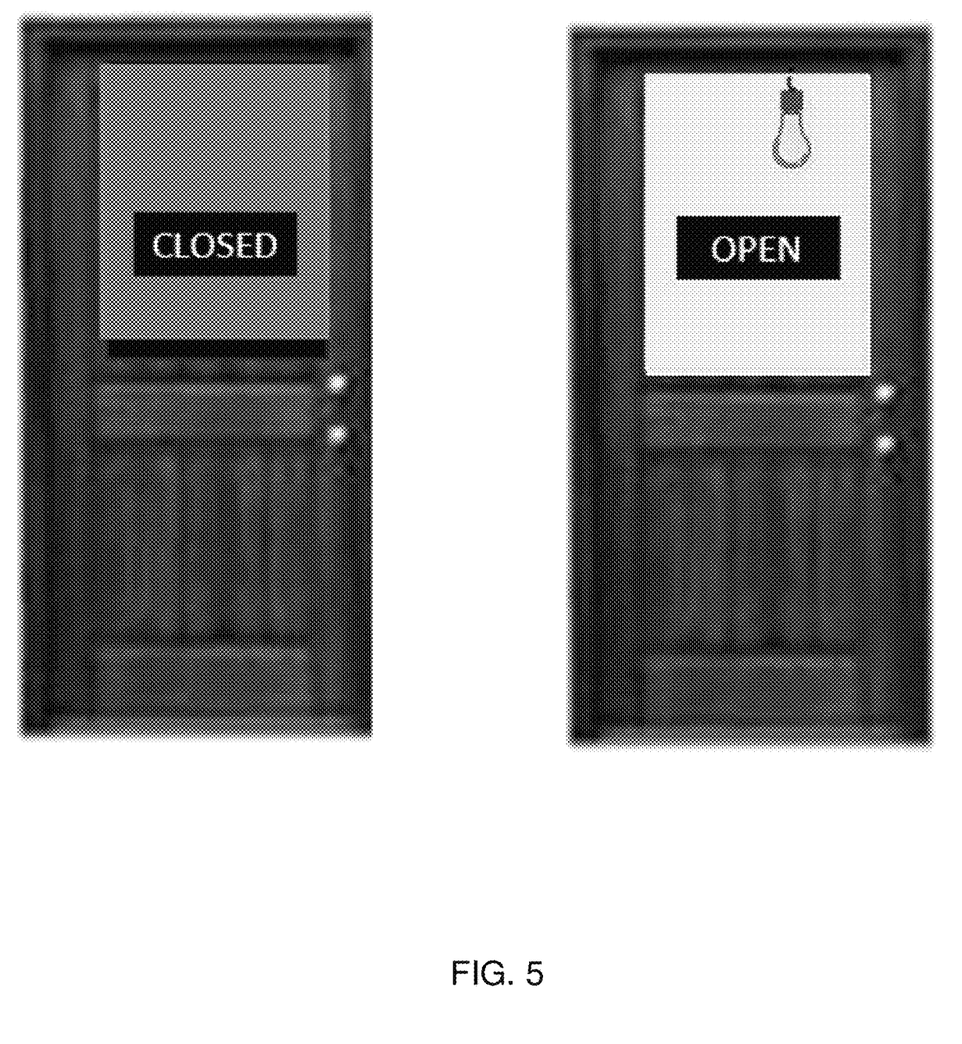
FIG. 5 depicts a rolling shade of the invention that includes a changing message in addition to a change in transmissivity.
Figure 6:
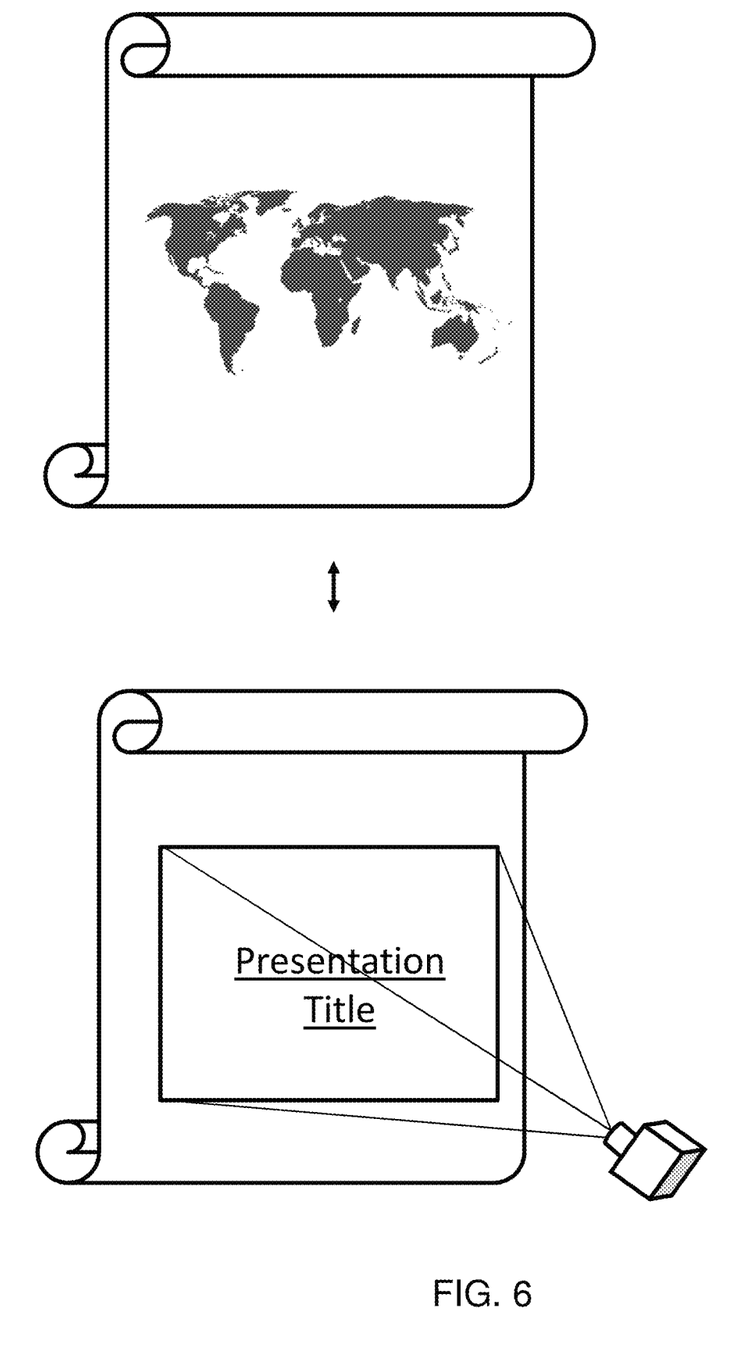
FIG. 6 depicts a rolling screen for a classroom that is configured to show a map in a first configuration and to provide a reflective screen in a second configuration.

The variable transmission structures of systems of the invention may also include a single flexible medium, such as shown in FIGS. 5 and 6. Such a variable transmission structure may take the form of a roller shade that can be opened and closed over a window (FIG. 5) or a wall (FIG. 6). Because the variable transmission structure is flexible, the transparent electrodes and the electro-optic medium must also be flexible, e.g., as described below. Like the vertical blind embodiment of FIGS. 2 and 3, the roller shades can alter the transmissivity and/or color of the covering. Additionally, for certain applications, the variable transmission structures will be embedded with words or instructions, such as in FIG. 5, or with images, as shown in FIG. 6. FIG. 6 represents a classroom map that can be switched from a map mode to a reflective mode, allowing the screen to be used to project a presentation.

Figure 7A:
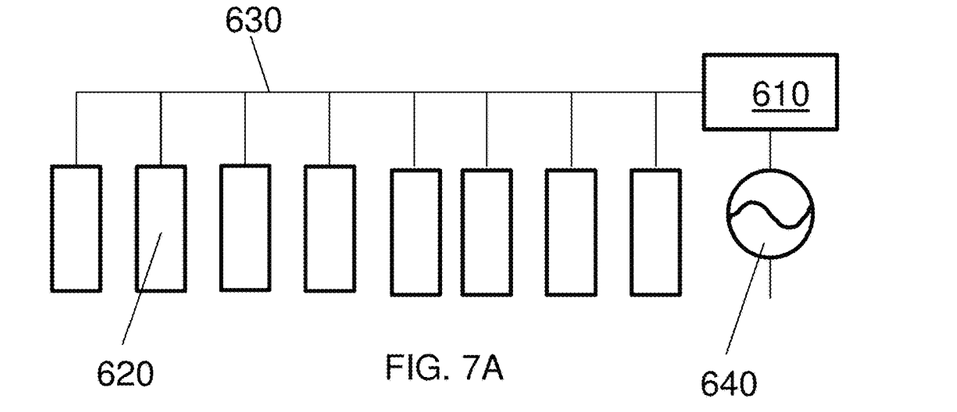
FIG. 7A depicts a first power and control configuration wherein a controller receives standard line current and provides power and control to a plurality of variable transmission structures via direct power and signal wiring.
Figure 7B:
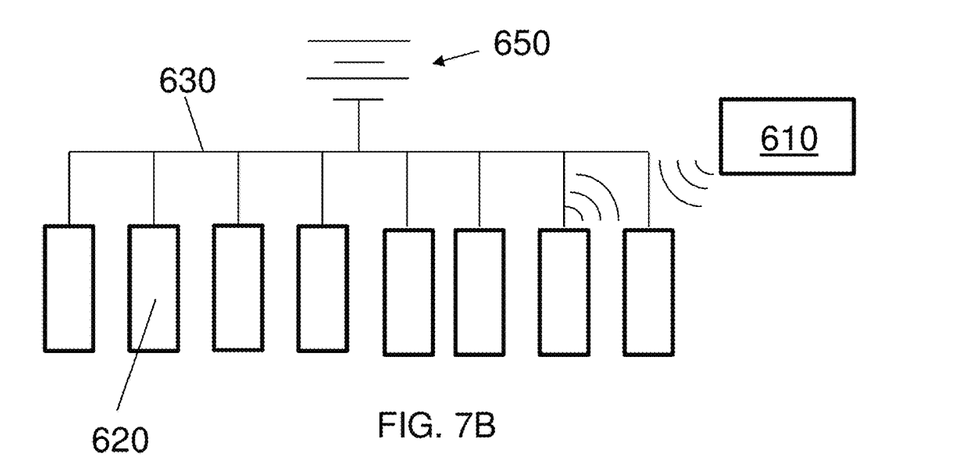
FIG. 7B depicts a second power and control configuration wherein the variable transmission structures are powered from a battery while they receive signals to change states wirelessly from a controller.
Figure 7C:
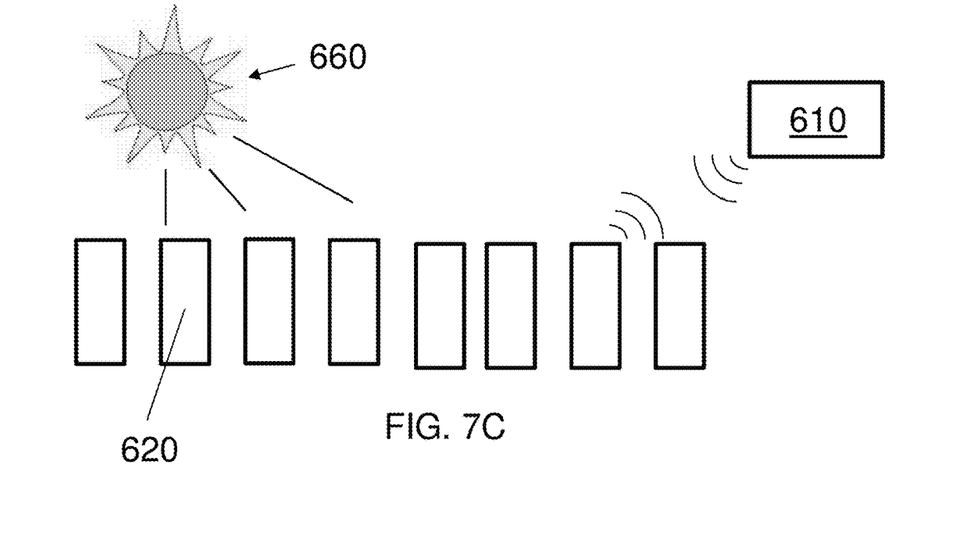
FIG. 7C depicts a third power and control configuration wherein the variable transmission structures are powered from photovoltaic cells while they receive signals to change states wirelessly from a controller.

Various embodiments of a system of the invention are shown in detail in FIGS. 7A-7C. A system of the invention includes a plurality of variable transmission structures that include an electro-optic medium and electrodes to control the electro-optic medium. The electro-optic medium will typically include an electrophoretic material including a plurality of electrically-charged particles disposed in a fluid and capable of moving through the fluid under the influence of an electric field. The electrophoretic material can be selected such that the variable transmission structures achieve the desired first and second states, such as clear and opaque, or color 1 and color 2, or clear and color 1 and color 2. The electrophoretic material can additionally be controlled to achieve variable states, e.g., as discussed above with respect to FIG. 3. While the structures are described throughout this description as "variable transmission structures" it is understood that "variable color structures" are fabricated using the same materials, as described below, but configured to only vary between color states.

Variable transmission and variable color systems of the present invention will typically use a controller 610 configured to control the states of the variable transmission structure(s) 620. The controller 610 may be of varying complexity; for example, the controller may simply include voltages for "on" and "off" states, and a user may simply program the times of day that the variable transmission structures 620 should be in each state. On the other hand, the controller 610 may include algorithms for varying the state of the variable transmission structures 620 based upon input from a sensor, e.g., a sensor that determines exterior light levels. The controller 610 may also be able to change the state of particular variable transmission structures 620 in order to form a pattern. Typically, the controller 610 transmits a signal to each variable transmission structure to switch states, or to change to a particular gray level.

In simple designs, such as FIG. 7A, the controller 610 may provide a voltage sent via a wire 630 to an electrode, thereby causing all of the variable transmission structures 620 to change state. Such controllers may also include a power supply 640, which is, for example, coupled to a power line (e.g., 120V, 60 Hz). Alternatively, the signal produced by the controller 610 may be a simple command string, which will be familiar to anyone familiar with networking or internet technology, i.e., the controller transmits a series of packages of information with each package containing an address portion identifying the variable transmission structure 620 for which the signal is intended, and a data portion specifying the state to be assumed by that variable transmission structure 620.

In other embodiments, the variable transmission structures 620 may communicate with the controller 610 wirelessly, e.g., via WiFi, ZIGBEE, BLUETOOTH, radio control, etc., as shown in FIGS. 7B and 7C. The specific protocol used is not critical, however low power options such as ZIGBEE and BLUETOOTH are sufficient for close range control. (Of course, while FIGS. 7A-7C suggest a single controller for each "set" of variable transmission structures 620, it is possible for a single controller 610 to control multiple "sets" of variable transmission structures to provide coordinated transitions of transparency and/or color.) In one wireless configuration, each variable transmission structure 620 "listens" to all packages put only acts in response to packages bearing its own address. The address portion of each package may be a serial number or similar unique identifier of a particular tile; this allows for relative easy replacement of a damaged, destroyed or malfunctioning structures.

In addition to having the capacity to be controlled wirelessly, some embodiments will be powered independently via a battery 650 or from the sun 660. As shown in FIG. 7C, in some embodiments that variable transmission structures 620 will be powered with solar cells that receive energy from incident sunlight. In most embodiments, the solar cells will not be transparent, but rather appear as a dark portion at the top or bottom of the variable transmission structure 620. The solar cells are preferably flexible solar cells, such as Power Film MP3-37 Flexible A-Si cells, which give high efficiency in low light conditions. Numerous other sizes and shapes of solar cell can be used depending upon the size and shape of the variable transmission structure 620. There are many commercial solar options to choose from in addition to the flexible ones. Alternatively, other power harvesting options, such as RF harvesting, can be used.

Numerous methods can be used for shuttering pigments in response to an applied electric field, as described in detail below. As already mentioned, the variable transmission structures of the present invention may make use of electro-optic layer formed from microcapsules, which may be coated in roll-to-roll processes. Alternatively, the electro-optic layers may use microcells, microcells or wells, such as are known in the art. Although the invention will hereinafter primarily be described with regard to electro-optic layers using microcapsules, it is believed that those skilled in the technology of electro-optic displays will have no difficulty adapting the microcapsule based structures described to other methods for spatially segregating the pigment containing phases. These several methods are described separately below, but it should be understood that a single variable transmission structure of the present invention may make use of more than one of such construction, either at the same time or as alternative methods of operation at different times.

U.S. Pat. Nos. 7,116,466, 7,304,787, and 7,999,787 describe embodiments of electrophoretic displays comprising an electrophoretic medium having a plurality of charged particles suspended in a suspending fluid, and two electrodes disposed on opposed sides of the electrophoretic medium, at least one of the electrodes being light-transmissive and forming a viewing surface through which an observer can view the display, the display having a closed optical state in which the charged particles are spread over substantially the entire viewing surface so that light cannot pass through the electrophoretic medium, and an open optical state in which the electrophoretic particles form chains extending between the electrodes so that light can pass through the electrophoretic medium, the display further comprising insulating layers disposed between the electrodes and the electrophoretic medium. The display may comprise a voltage supply and a controller for applying voltages to the two electrodes. Typically a high frequency (alternating current) voltage is used to drive the display to its open optical state, while a low frequency (direct current) voltage is used to drive the display to its closed optical state. In advanced embodiments, the voltage supply and controller can also provide an intermediate frequency voltage, between the high and low frequency extremes, effective to drive the display to a gray state intermediate the open and closed optical states of the display. The same principles can be used to control the variable transmission structures described below.

U.S. Pat. No. 7,999,787 also describes a method for operating an electrophoretic display, the method comprising providing an electrophoretic medium comprising a fluid and a plurality of at least one type of particle within the fluid, applying to the medium an electric field having a first frequency, thereby causing the particles to undergo electrophoretic motion and producing a first optical state, and applying to the medium an electric field having a second frequency higher than the first frequency, thereby causing the particles to undergo electrophoretic motion and producing a second optical state different from the first optical state. This method is referred to as the "varying frequency" method. In such a method, the first frequency may be not greater than about 10 Hz and the second frequency may be at least about 100 Hz. Conveniently, the electric fields have substantially the form of square waves or sine waves, though other waveforms can of course be used. It may be advantageous for the second fre-quency electric field to have a larger magnitude than the first frequency electric field.

In the patents described above, it is common to refer to both "gray" and "dark" states. The term "gray state" is used herein in its conventional meaning in the imaging art to refer to a state intermediate two extreme optical states of a pixel, and does not necessarily imply a black-white transition between these two extreme states. For example, it is known to use electro-optic displays as variable transmission windows in which the extreme states are substantially transparent and essentially opaque, so that an intermediate "gray state" would be partially transmissive but may not actually be gray in color. Indeed, if the particles used are light-scattering, a partially transmissive "gray state" may actually be colored white. The term "monochrome" may be used hereinafter to denote a drive scheme which only drives pixels to their two extreme optical states with no intervening gray states. "Dark" states, as used herein, refer to maximum opacity, however the "dark" state may actually correspond to the maximum color provided by a pigment, e.g., a red pigment.

The terms "bistable" and "bistability" are also used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Electrophoretic media used in the invention are typically sandwiched between transparent electrodes which provide electric fields that stimulate transitions between states, thereby creating the desired transmission and color effects, e.g., as discussed below. The electrodes are connected via leads to signal lines that may be in communication with a controller that is directly connected to each transparent (e.g., via wires), or the transparent electrodes may ultimately communicate with the controller via a wireless signal, as described above. The transparent electrodes are typically fabricated using indium tin oxide (ITO), indium zinc oxide (IZO) or other transparent conductive material. Other clear conductors, such as PEDOT, CNT, graphene, and nanowires, can be used in fabricating transparent electrodes. The transparent electrodes may be adhered to various other layers, e.g., a layer of encapsulated electrophoretic media, using optically-clear laminate adhesives known in the art. In other embodiments, the adhesive is a custom polyurethane latex adhesive, for example a polyurethane doped with an imidazolium hexafluorophosphate dopant to control electrical properties, e.g., as described in U.S. Pat. No. 8,446,664.

Several embodiments of encapsulated electrophoretic media are shown in FIGS. 8A-10B. The capsules shown in FIGS. 8A-8C, 9A, and 9B can be formed using self-assembly of coated layers of microcapsules. As discussed in many of the aforementioned E Ink patents and applications, and especially in U.S. Pat. Nos. 6,067,185, 6,392,785, 7,109,968, and 7,391,555, such encapsulated media can be prepared by forming an emulsion in which the discontinuous phase comprises droplets of an electrophoretic internal phase that comprises at least one pigment and a fluid (which is typically a low polarity, substantially water-immiscible hydrocarbon), normally with the addition of a charge control agent. The continuous phase of the emulsion comprises an aqueous solution of a polymer, typically gelatin. Polymeric material is deposited onto the surface of the droplets by, for example, formation of a coacervate of the gelatin and a second polymer, typically acacia, to form a thin capsule wall that may optionally be cross-linked, for example with an aldehyde. The resultant deformable microcapsules are spheres of approximately 20-100 µm in diameter. When such microcapsules are coated on a flat surface at a controlled coverage, they form essentially a monolayer of capsules. When this monolayer is dried, the capsules tend to contract vertically (i.e., perpendicular to the surface on which they are coated) and expand laterally to form oblate spheroids. Eventually, as the capsules expand laterally, their sidewalls come into contact with each other, and the capsules deform into polyhedral prisms whose shapes are similar to those formed by cells in foams.

Figure 8A:
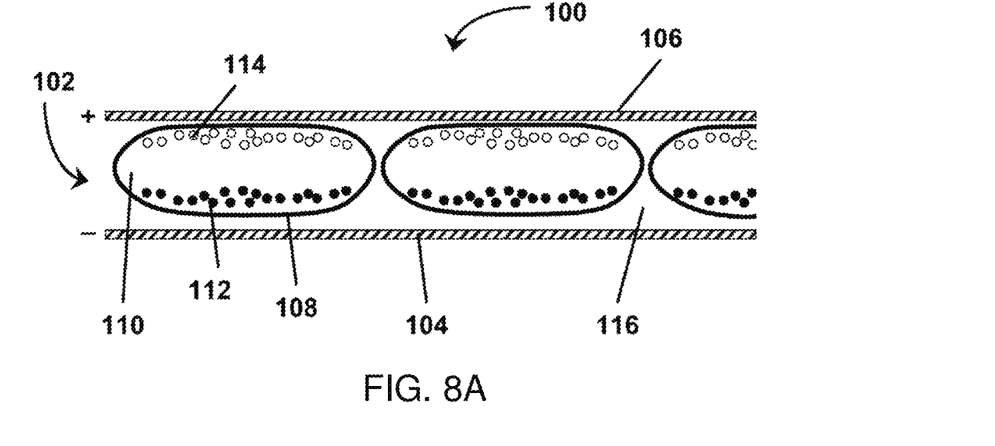
FIG. 8A illustrates a first (colored) state of an embodiment of an electrophoretic medium of the invention. In the embodiment of FIG. 8A the front and back surfaces of the variable transmission structures are different colors.

FIGS. 7A and 7B depict an embodiment of the invention comprising an electrophoretic material including a plurality of electrically charged particles disposed in a fluid and capable of moving through the fluid under the influence of an electric field. FIG. 8A is a highly schematic cross-section through a dual particle encapsulated electrophoretic variable transmission structure (generally designated 100). This variable transmission structure 100 comprises an electrophoretic medium (generally designated 102) in the form of a thin film sandwiched between a rear electrode 104 and a front plane electrode 106. The electrophoretic medium 100, itself, comprises a plurality of capsules each having a capsule wall 108 within which are retained a fluid 110, black electrophoretic particles 112 and white electrophoretic particles 114, wherein the particles 112 and 114 bear charges of opposite polarity. For the sake of illustration, it will be assumed below that the black particles 112 bear positive charges and the white particles 114 bear negative charges, although of course these charges could be reversed. The electrophoretic medium 100 further comprises a polymeric binder 116, which surrounds the capsules and forms them into a mechanically coherent layer.

It will be apparent from FIG. 8A that when a voltage difference exists between the electrodes 104 and 106, the electric field to which the electrophoretic medium 102 is subjected is predominantly normal to the plane of this medium. Hence, the electrophoretic forces on the electrophoretic particles 112 and 114 caused by this electric field drive the electrophoretic particles perpendicular to the plane of the medium 102, towards or away from the front electrode 106. For example, as illustrated in FIG. 8A, if a positive potential is applied to the front electrode 106 and a negative potential to the rear electrode 104, the negatively charged white particles 114 are driven adjacent the front electrode 106 and the positively charged black particles are driven adjacent the rear electrode 104, so that an observer viewing the variable transmission structure through the front electrode 106 sees the white color of the particles 114. Reversing the potentials on the electrodes 104 and 106 interchanges the positions of the particles 112 and 114, so that the observer now sees the black particles 112. By controlled applications of potentials to the electrodes intermediate gray states can also be shown to the observer.

Figure 8B:
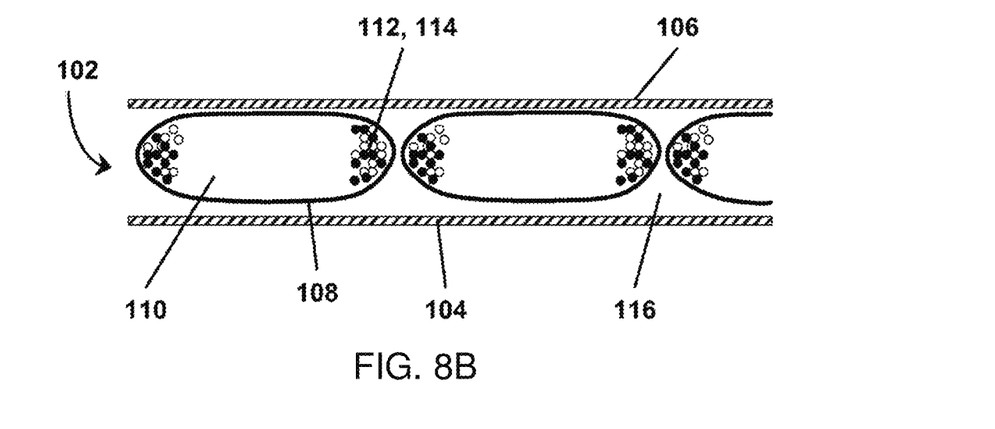
FIG. 8B illustrates a second (transparent) state of an embodiment of an electrophoretic medium of the invention.
Figure 8C:
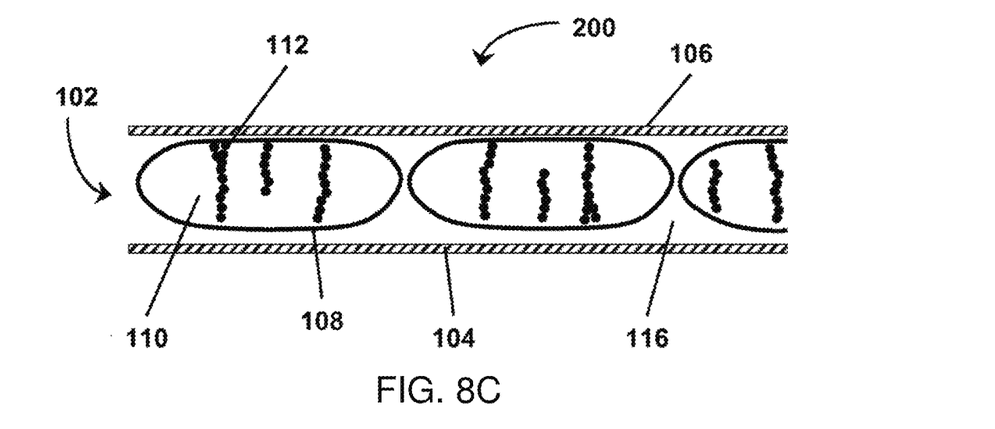
FIG. 8C illustrates a third (transparent) state of an embodiment of an electrophoretic medium of the invention.

Two examples of shuttered electrophoretic particle configurations that can be achieved are illustrated in FIGS. 8B and 8C. Because of differences between the dielectric constants and conductivities of the particles, fluid and polymeric binder and/or capsule wall, the particles can be attracted toward or away from side walls of the capsules. For example, if the electrophoretic particles are more polarizable than the fluid, owing to the particles having a larger dielectric constant or a larger electrical conductivity than that of the fluid, and if the external components (capsule wall and/or binder) are also more polarizable than the fluid, then the electrophoretic forces will drive the particles toward the side walls of the capsules, where the vertical thickness of the capsules is less than in the middle of the capsule and the electric field magnitude is larger. The particle configuration resulting from electrophoretic forces alone is illustrated in FIG. 8B, which shows the result of applying such electrophoretic forces to the encapsulated variable transmission structure shown in FIG. 8A.

A second example of particle configuration resulting from electric field interaction is shown in FIG. 8C. Due to the difference in polarizability of the particles and the fluid, the electric field around a particle is distorted. This distortion has associated with it field gradients that attract and repel other particles in their surroundings through a dielectrophoretic force. This dielectrophoretic force is often referred to as "dipole-dipole" interaction. A swarm of such particles in an electric field will tend to form chains predominantly along the direction of the applied field, as illustrated in FIG. 8C. This chaining can strongly affect the optical state of the variable transmission structure. For example, if the particles that chain under an electric field are white, scattering particles, the chaining will reduce their scattering power. The variable transmission structure will appear more transparent, or, if a black or light absorbing background is employed, the variable transmission structure will appear less white when the particles chain. Alternatively, if the particles absorb light, for example, if the particles are black as illustrated in FIG. 8C, then chain formation will render the variable transmission structure more transparent, or, if a white background is employed, then the variable transmission structure will appear brighter. These effects occur because the chaining of particles brings them into a more "clumped" state, where large portions of the viewing surface are free of particles and therefore more light transmissive.

Figure 9A:
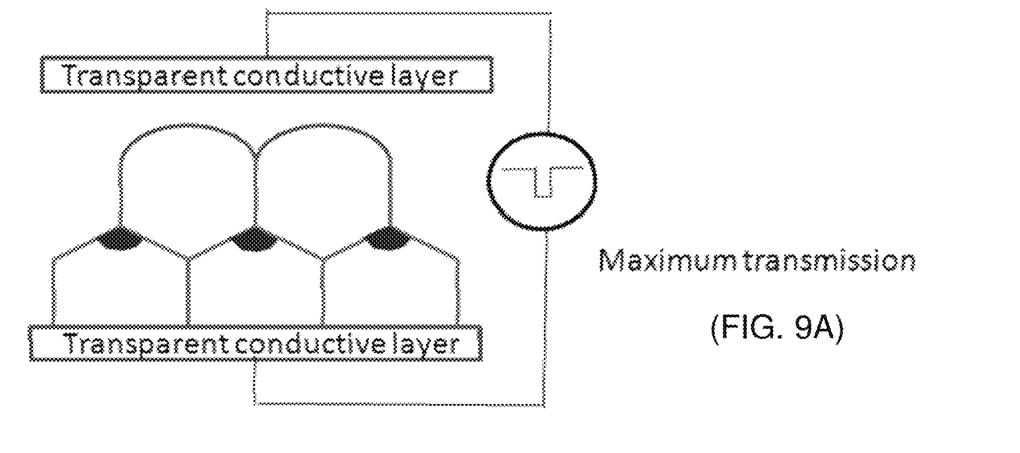
FIG. 9A illustrates a first (transparent) state of an embodiment of an electrophoretic medium of the invention. In the embodiment of FIG. 9A the pigment has collected at nodes, thereby allowing most of the light to pass through the medium.
Figure 9B:
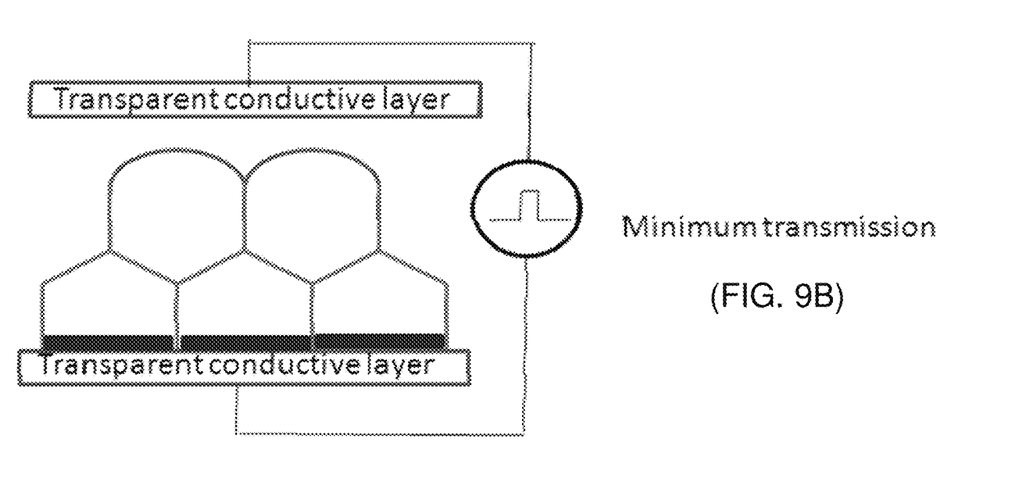
FIG. 9B illustrates a second (colored) state of an embodiment of an electrophoretic medium of the invention. In the embodiment of FIG. 9B, the pigment is distributed over the front surface of the variable transmission structure giving the appearance of a solid color.

In other embodiments, the electrophoretic medium may include stacked layers of encapsulated particles as depicted in FIGS. 9A and 9B. Ideally, a single layer of capsules will form a "honeycomb" (a two dimensional hexagonal lattice) of hexagonal prisms whose side walls, viewed in projection, meet at 120 degree angles, as shown (in idealized form) in FIGS. 9A and 9B. Also, as shown in FIGS. 9A and 9B, the faces of the capsules that are in contact with the planar substrate onto which the capsules are coated will conform to the flat surface, while the exposed face of each capsule will adopt a curved, "domed" shape.

When a second layer of microcapsules is coated on top of the first layer, surface tension forces leading to minimization of surface energy tend to cause deformation of the domed upper surfaces of the capsules in the first layer into a foam-like geometry as illustrated schematically in FIGS. 9A and 9B. In this geometry, the upper portion of each capsule in the first layer has a substantially pyramidal shape in which the pyramidal portion are substantially flat and the intervening edges are substantially straight lines, four of which meet at each vertex at the tetrahedral angle of 109.5 degrees. In an idealized geometry, the lower portions of each capsule in the second layer also has a substantially pyramidal shape, so that the pyramidal portions of the first and second layers fit together with the lowest vertex of each pyramidal section in the second layer filling into the recess between three pyramidal sections in the second layer, as shown in FIGS. 9A and 9B.

FIG. 9A illustrates the shuttered optical state of a variable transmission structure which uses front and back conductive layers to drive the pigment particles toward the vertex of the pyramidal form, thereby allowing most of the incident light to pass through the structure. Geometrical/capsule wall shuttering can be achieved naturally by the use of more than one layer of capsules whose wall materials are more electrically conductive than their internal phase. Furthermore, the capsule wall of one layer of capsules can act as a concentrator "electrode" for a second layer of capsules. In addition, a geometrical shutter may be provided by the pyramidal shape that may be adopted by the capsule, as described above. In other embodiments, geometrical shutters may be achieved by depositing a coating of capsules onto, for example, V-shaped grooves as described in U.S. Pat. Nos. 6,130,774 and 6,172,798. Geometrical shutters may also be fabricated using photolithographic or embossing methods, or other methods that are well-known in the art.

As shown in FIG. 9B, when the potentials applied to electrodes are reversed, i.e., when the pigment particles are attracted towards the opposite electrode, the pigment spreads out over the whole area of the domed portion, blocking out most of the incident light. Other methods for shuttering, such as use of anisotropic particles, for example, needles or plates that may be oriented with their principal axes either perpendicular or parallel to the plane of the variable transmission structure, or color-changing pigments, or swelling and deswelling of gels, or other similar methods that are known in the art, may also be used in the variable transmission structures of the present invention.

In some embodiments, the capsule walls may also be charged. Thus, in some embodiments, the pigment particles and the capsule wall bear charges of opposite polarity. (Obviously, this aspect of the invention cannot generally be applied to capsules which contain particles bearing charge of both polarities, and is best suited to capsules containing only one type of particle or "same polarity dual particle capsules, as described for example in U.S. Pat. No. 6,870,661). By providing an attractive force between the pigment particles and the capsule wall, a perpendicular component may be added to the electrical force applied to the particles, and so that the particles spread out laterally from the small region they occupy in their shuttered position. The necessary attractive force may be electrostatic. For example, if gelatin/acacia is used to form the capsule wall, and a charging agent such as Solsperse 17000 (available from Lubrizol) is used, the capsule wall may attain a negative charge and a pigment that attains a positive charge with the same charging agent is preferred. Other methods that may provide attraction between the pigment particles and the capsule wall include the use of flocculating agents, especially depletion flocculants. The result of using such capsule-wall attraction is that the pigment will be essentially invisible at either extreme of a DC pulse, but visible during the transition from one concentrated state (at the top of the capsule) to another concentrated state (at the bottom of the capsule) or vice versa. In one embodiment, the pigment may be trapped in what would be a transient state in simple DC driving by driving with AC having a frequency of between about 30 and 50 Hz, and applying a DC offset to the AC drive. Of course, the invention is not confined to use of a mobile charged pigment with a capsule wall bearing a charge of the opposite polarity but extends to the use of such a pigment with any fixed surface bearing a charge of the opposite polarity. The fixed surface acts to constrain the motion of the pigment in an applied field. Additionally, the medium containing the pigment and the surface need not be encapsulated.

The shuttering mechanisms described above may be combined with conventional switching of pigments using DC addressing to give rise to particle motion within a capsule parallel to the applied field as already mentioned with regard to FIGS. 8A-8C. In this case it is desirable that geometrical/capsule wall shuttering not occur, and this can be ensured in multi-layer capsule constructions by incorporating more pigment into the capsule than can be concentrated in a groove or crevice. Additionally, depending upon the end application, conventional electrophoretic switching may involve a single pigment moving through a dyed liquid, dual pigments of the same or opposite charge, or combinations of multiple pigments and dyed fluids, as described in the aforementioned E Ink patents and applications. The use of a dyed liquid may be appropriate when it is desired that the variable transmission structure has a tint of a particular color when the electo-optic medium is driven to transparent.

Figure 10A:
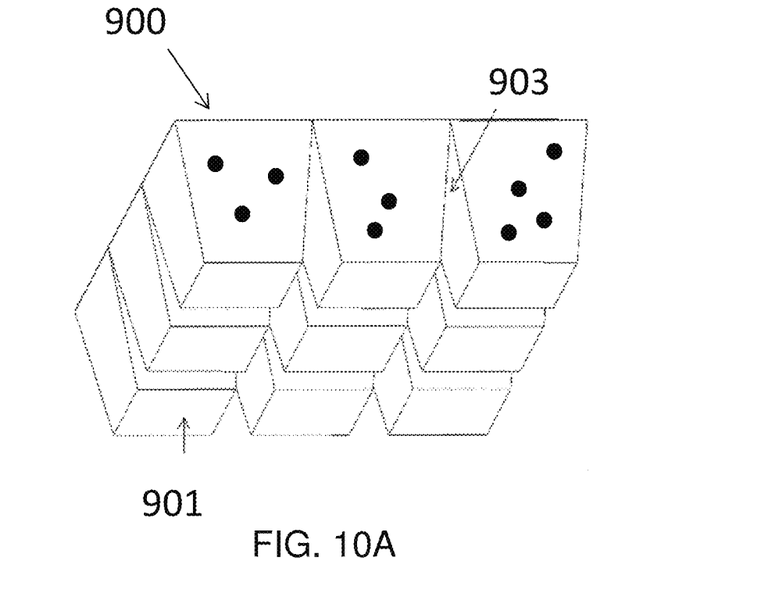
FIG. 10A illustrates an alternative configuration of the electrophoretic medium, including pre-formed microcells that segregate portions of the pigment to avoid gravitational settling.
Figure 10B:
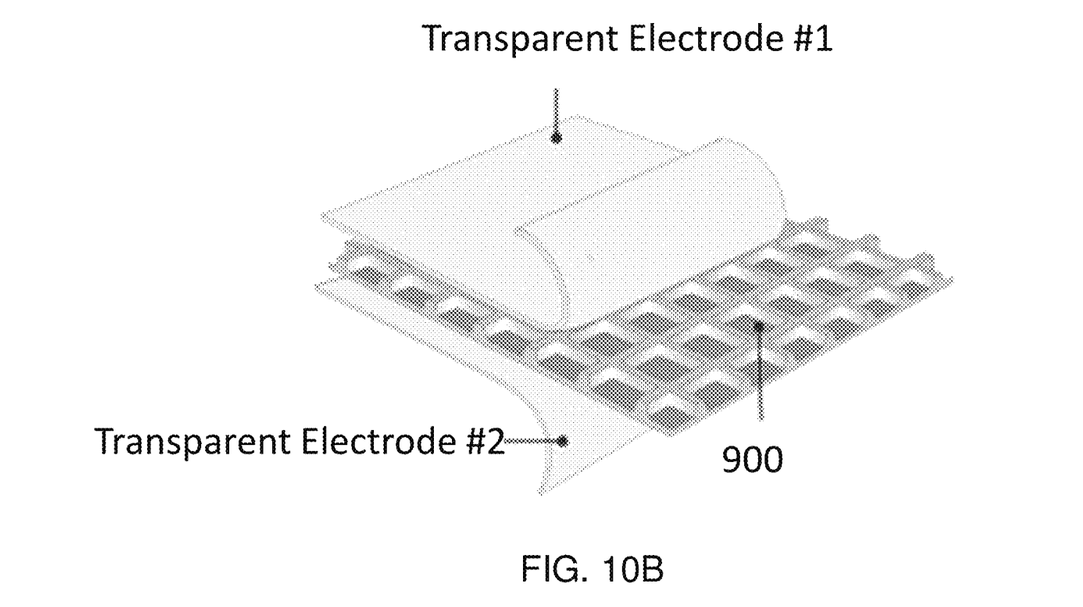
FIG. 10B illustrates joining front and back transparent electrodes to the microcell of FIG. 10A after the microcells are filled with an electrophoretic medium.

Additionally, an electrophoretic medium of the invention may be encapsulated in microcells 900, as illustrated in FIGS. 9A and 9B. The microcapsules may be constructed from flexible polymers such as multifunctional acrylates or methacrylates, multifunctional vinylethers, multifunctional epoxides, polyethylene terephthalate (PETE) or other high-density polyethylenes, polypropylene, or modified polyvinyl chloride (PVC). The microcells may be fabricated with embossing, photolithography, contact printing, vacuum forming, or other suitable methods. In this construction, the microcells 900 are sandwiched between a front and back electrodes, made from transparent materials, e.g., as shown in FIG. 10B. In the same fashion, as described above with respect to FIGS. 8A-9B, the charged pigment particles can be driven by an electric field to gather at a designated location where the pigment will not block the incident light, or to a different location where the pigment will block the incident light using suitable electric fields. While the microcells 900 are shown as pyramidal in FIG. 10A, it is understood that the microcells 900 can be formed to take other shapes, such as cones, hemispheres, squares, or other polyhedrons.

In one embodiment, the microcells 900 are fabricated separately and then positioned between transparent electrodes, e.g., as shown in FIG. 10B. For example, the microcell structure may be fabricated by embossing. The embossing is usually accomplished by a male mold which may be in the form of a roller, plate or belt. The embossed composition may comprise a thermoplastic, thermoset or a precursor thereof. The embossing process is typically carried out at a temperature higher than the glass transition temperature of the microcell material. A heated male mold or a heated housing substrate against which the mold presses may be used to control the embossing temperature and pressure. The male mold is usually formed of a metal such as nickel. Once formed, the microcells are filled with pigment particles, fluid, and polymeric binder. The filled microcells are then sealed and the sealed microcells are laminated between transparent electrodes, as depicted in FIG. 10B. Other methods of filling the microcells with electrophoretic materials and affixing the electrodes may be used to construct the variable transmission structures of the invention. For example, a first transparent electrode may be adhered to the bottom of the microcells, and a conductive transparent sealing material may be spread over the filled microcells to form a second transparent electrode.

In addition to the embodiments discussed above, which include discrete microcapsules in an encapsulated electrophoretic medium, an electrophoretic medium of the invention could include a continuous electrophoretic phase, e.g., a polymer-dispersed electrophoretic medium, not shown in the figures. In a polymer-dispersed medium a plurality of discrete droplets of an electrophoretic fluid and a continuous phase of a polymeric material are dispersed in a polymer, and the discrete droplets of electrophoretic fluid may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A woven material made from a plurality of individual strips of electrophoretic material, wherein each individual strip of electrophoretic material has a first optical transmission state and a second optical transmission state, wherein the first and second optical transmission states vary in opacity, and wherein each individual strip of electrophoretic material includes
   a first flexible light-transmissive electrode,
   a second flexible light-transmissive electrode, and
   a plurality of electrically charged particles disposed in a fluid and capable of moving through the fluid under the influence of an electric field, wherein the plurality of electrically charged particles are disposed between the first flexible light-transmissive electrode and the second flexible light-transmissive electrode, the electrically charged particles are driven between the first optical transmission state and the second optical transmission states when an electric field is applied between the first flexible light-transmissive electrode and the second flexible light-transmissive electrode, and wherein the first or the second optical transmission state allows for greater than 50% of the incident visible light to be transmitted through the electrophoretic material.

2. The woven material of claim 1, wherein the electrically charged particles disposed in a fluid and capable of moving through the fluid under the influence of an electric field are contained in a plurality of capsules.

3. The woven material of claim 1, wherein the electrically charged particles disposed in a fluid and capable of moving through the fluid under the influence of an electric field are dispersed as a plurality of discrete droplets in a polymer binder.

4. The woven material of claim 1, wherein the woven material additionally includes fabric strips.

5. The woven material of claim 4, wherein the individual strips of electrophoretic material are woven in a first direction and the fabric strips are woven in a second direction.

6. The woven material of claim 4, wherein the woven material includes three times more surface area of fabric than surface area of electrophoretic material.

7. The woven material of claim 4, wherein the woven material includes equal surface areas of fabric and electrophoretic material.

8. The woven material of claim 1, wherein a portion of the electrically charged particles have a color selected from red, green, blue, cyan, magenta, yellow, and white.

* * * * *